United States Patent
Roychowdhury et al.

(10) Patent No.: US 10,884,394 B2
(45) Date of Patent: Jan. 5, 2021

(54) ADDITIVE MANUFACTURING MACHINE CALIBRATION BASED ON A TEST-PAGE BASED OBJECT

(71) Applicant: General Electric Company, Schenectady, NY (US)

(72) Inventors: Subhrajit Roychowdhury, Schenectady, NY (US); Thomas Spears, Springdale, OH (US); Justin Gambone, Jr., Niskayuna, NY (US); Ruijie Shi, Clifton Park, NY (US); Naresh Iyer, Schenectady, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 185 days.

(21) Appl. No.: 16/127,545

(22) Filed: Sep. 11, 2018

(65) Prior Publication Data

US 2020/0081414 A1    Mar. 12, 2020

(51) Int. Cl.
G05B 19/4099    (2006.01)
B33Y 50/00    (2015.01)

(52) U.S. Cl.
CPC .......... G05B 19/4099 (2013.01); B33Y 50/00 (2014.12); *G05B 2219/31304* (2013.01);
(Continued)

(58) Field of Classification Search
None
See application file for complete search history.

(56) References Cited

U.S. PATENT DOCUMENTS 5,123,734 A * 6/1992 Spence ................ G01J 1/4257
356/121
5,430,666 A  7/1995 DeAngelis et al.
(Continued)

FOREIGN PATENT DOCUMENTS

CN        20653684 U     10/2017
CN        107745520 A    3/2018
WO        2016/198885 A1 12/2016

OTHER PUBLICATIONS

Sitthi-Amorn, Pitchaya et al., "MultiFab: A Machine Vision Assisted Platform for Multi-material 3D Printing", ACM Transactions on Graphics (TOG), vol. 34, Issue: 04, Aug. 2015, 11pgs.

*Primary Examiner* — Bernard G Lindsay
(74) *Attorney, Agent, or Firm* — Buckley, Maschoff & Talwalkar LLC

(57) ABSTRACT

A method of calibrating an additive manufacturing machine includes obtaining a model for the additive manufacturing machine, obtaining a baseline sensor data set for a particular additive manufacturing machine, creating a machine-specific nominal fingerprint for the particular additive manufacturing machine with controllable variation for one or more process inputs, producing on the particular additive manufacturing machine a test-page based object, obtaining a current sensor data set of the test-page based object on the particular additive manufacturing machine, estimating a scaling factor or a bias for each of the one or more process inputs from the current data set, and updating a calibration file for the particular additive machine if the estimated scaling error or bias are greater than a respective predetermined tolerance. A system for implementing the method and a non-transitory computer-readable medium are also disclosed.

13 Claims, 4 Drawing Sheets

(52) U.S. Cl.
CPC ............ *G05B 2219/35134* (2013.01); *G05B 2219/49007* (2013.01)

(56) References Cited

U.S. PATENT DOCUMENTS

| | | |
|---|---|---|
| 2006/0111807 A1 | 5/2006 | Gothait et al. |
| 2016/0082668 A1 | 3/2016 | Perret et al. |
| 2016/0282850 A1* | 9/2016 | Capobianco, Jr. ............................ G05B 19/4099 |
| 2017/0057170 A1 | 3/2017 | Gupta et al. |
| 2017/0090462 A1* | 3/2017 | Dave ...................... G01N 21/71 |
| 2017/0203512 A1 | 7/2017 | Gold |
| 2018/0141324 A1* | 5/2018 | Tasti ...................... B33Y 10/00 |
| 2018/0186067 A1* | 7/2018 | Buller ...................... B28B 1/001 |

* cited by examiner

| No. | Power scaling | Power bias |
|---|---|---|
| 1 | 0.97947 | -4.731 |
| 2 | 0.98191 | -5.4199 |
| 3 | 0.97992 | -5.0699 |
| 4 | 0.98069 | -5.0984 |
| 5 | 0.97847 | -4.8696 |
| 6 | 0.9831 | -5.9291 |
| 7 | 0.97868 | -4.7746 |
| 8 | 0.98473 | -5.9594 |
| 9 | 0.97617 | -4.2073 |
| 10 | 0.97583 | -4.1411 |
| ... | ... | ... |
| ... | ... | ... |
| Mean | 0.979897 | -5.02003 |
| Std | 0.002836849 | 0.621539358 |

Table I

ADDITIVE MANUFACTURING MACHINE CALIBRATION BASED ON A TEST-PAGE BASED OBJECT

BACKGROUND

The term "additive manufacturing" refers to processes used to synthesize three-dimensional objects in which successive layers of material are formed by an additive manufacturing machine (herein: "additive manufacturing machine" or "additive machine") under computer control to create an object.

FIG. 1 schematically illustrates a cross-sectional view of a conventional laser additive manufacturing system 100 (e.g., Direct Metal Laser Melting (DMLM), Direct Metal Laser Sintering (DMLS), Selective Laser Melting (SLM), etc.). The apparatus 100 builds objects, for example, the part 122, in a layer-by-layer manner by sintering or melting a powder material (not shown) using an energy beam 136 generated by a source such as a laser 120. The powder to be melted by the energy beam is supplied by reservoir 126 and spread evenly over a build plate 114 using a recoater arm 116 (traveling in direction 134) to maintain the powder at a level 118 within a deposition volume 112. The energy beam 136 sinters or melts a cross sectional layer of the object being built under control of the galvo scanner 132. The build plate 114 is lowered and another layer of powder is spread over the build plate and object being built, followed by successive melting/sintering of the powder by the laser 120. The process is repeated until the part 122 is completely built up from the melted/sintered powder material. The laser 120 may be controlled by a control system including a processor and a memory. The computer system may determine a scan pattern or "mark" for each layer and control laser 120 to irradiate the powder material according to the scan pattern. After fabrication of the part 122 is complete, various post-processing procedures may be applied to the part 122. Post processing procedures include removal of access powder by, for example, blowing or vacuuming. Other post processing procedures include a stress relief process. Additionally, thermal, mechanical, and chemical post processing procedures can be used to finish the part 122.

Under conventional calibration, the control system sets the control values for one or more controllable process inputs. However, the true (realized) values are subject to various disturbances due to machine degradation, measurement error, and other operational factors. For example, the laser operating voltage value can be set to target a certain laser output power, but the actual realized laser power output from the laser often is not the exact value set by the control system. Sources of variation can include: machine degradation (material wear and tear, material properties change with time and usage), measurement error, ambient environment effects (temperature, pressure, moisture level, wind, sun), power source variation, ground and building vibration, and/or setting errors, operator variation. Also, readings provided by a sensor (a photodiode (PD) or an avalanche photodiode (APD)) can be impacted by disturbances —e.g., smoke/spattering from the melt pool, melt pool reflections and powder suspension within a reflection mirror's field-of-view, coefficient changes over time, particulate matter accumulation along the optical path, sensor degradation, power source fluctuation, and other factors. The sensor can be located on (or off) the optical axis of the laser source.

A file containing a 3D computer-aided design (CAD) model of the object to be manufactured is used to control the additive metal manufacturing machine. The laser's energy beam can be aimed automatically at points in space defined by the 3D model, thereby melting the material together to create a solid structure. The nature of the rapid, localized heating and cooling of the melted material enables near-forged material properties, after any necessary heat treatment is applied. In this manner, parts are built up additively layer by layer. Complex geometries can be created directly from the 3D CAD file data.

The CAD file is created for certain machine conditions (e.g., new or nominal) to satisfy product quality requirements. The same build file will respectively produce a product from the same machine, but after some usage tolerances can drift due to the disturbances. Substantial effort and time is required to change or calibrate each part of the machine and make it come back to the nominal condition.

Degradation or shift from nominal condition is a common issue with DMLM machines. To ensure that the machine is in acceptable state so that the same command will generate same material properties within acceptable tolerance, conventionally a re-calibration is performed at regular intervals. Conventional recalibrations are time consuming (days to weeks) depending on the machine factors being recalibrated. Moreover, conventional additive machine recalibration is strongly susceptible to operator-induced variation, as the recalibration accuracy is significantly dependent on the expertise of the operator and the operator's familiarity with the machine being recalibrated.

DETAILED DESCRIPTION

Figure 1:
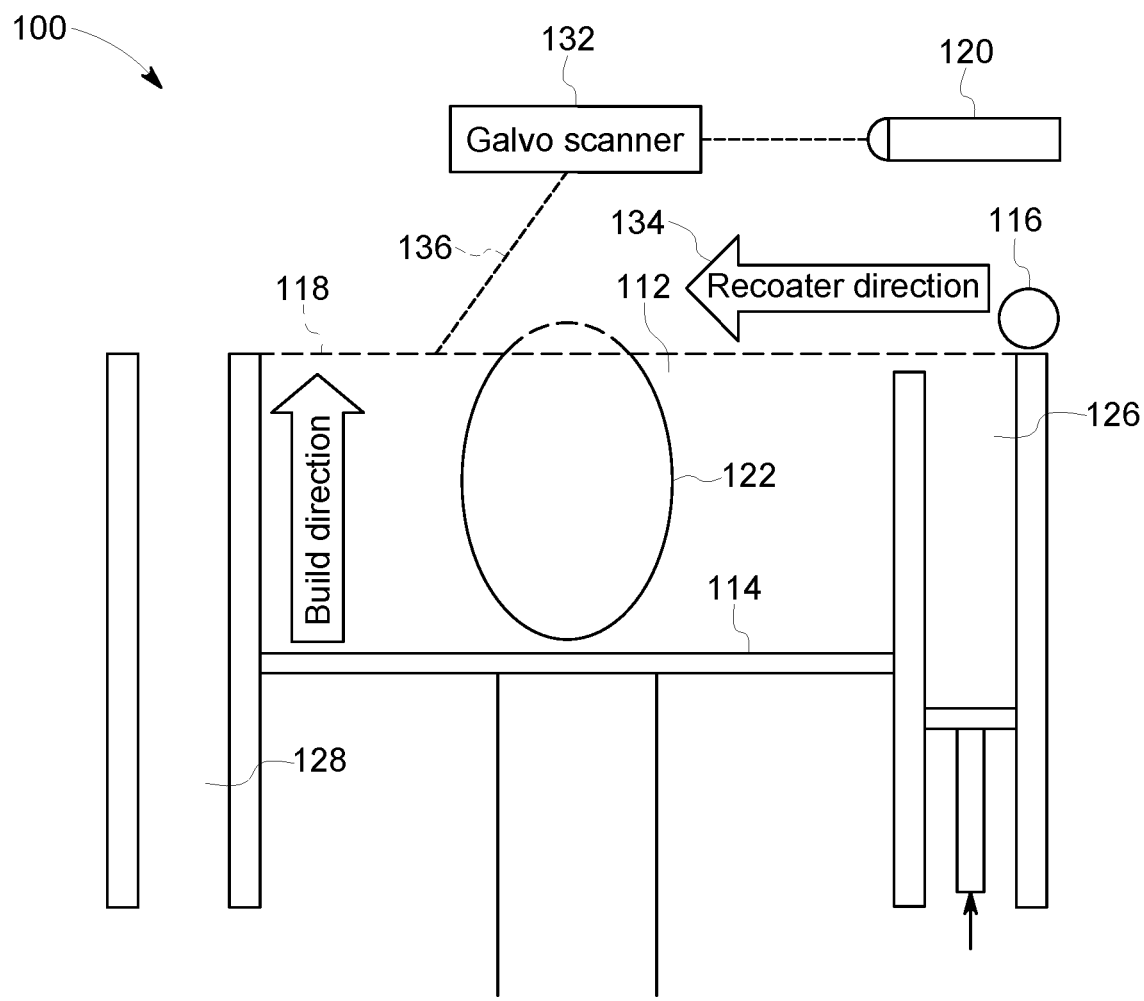
FIG. 1 schematically illustrates a conventional laser additive manufacturing apparatus.

Embodying systems and methods provide for automatic calibration of an additive machine. Embodiments generate a nominal machine-specific fingerprint from sensor data obtained while the machine is in its factory-new and/or in a suitable operational condition. The phrase "suitable operational condition" is used herein to describe the condition of an additive manufacturing machine that enables the additive machine to achieve production of a part per the part's design requirements. In accordance with embodiments, baseline sensor data is recorded while running a CAD file with a pre-determined scan pattern that creates a three-dimensional test-page based object. The nominal machine-specific fingerprint is obtained by incorporating the baseline sensor data into a generic model of the additive machine. The generic model is representative of a manufacturer's particular line of additive machines units.

In accordance with embodiments, to verify the calibration status of an additive a machine, the same test-page CAD file is run to create a subsequent exemplar test-page based object. During the recalibration production of each subsequent exemplar test-page based object, current sensor data is recorded to obtain a current machine fingerprint. A comparison between the current and the nominal machine fingerprints can be performed to quantify magnitude differences between parameters of the fingerprints. These magnitude differences are used by an embodying additive machine calibration algorithm to estimate the machine's operational drift/shift, which can be used to automatically adjust and/or update calibration files and tables in the additive machine.

Broadly, an additive machine (particularly a DMLM machine) can have three input variables: laser power (LP), scan speed (SS) and beam size (BS). Similarly, there can be one process output—i.e., sensor (APD) reading. A general relationship between the true value (nominal value) and the measured (realized) value can be expressed as: $x_{\_true}$=g($x_{\_meas}$)+w (where x can be one of LP, SS, BS setting, or the APD sensor reading, w is a random white noise signal). A simple linear calibration function that includes a scaling factor a and a bias b can be used: $x_{\_true}$=g($x_{\_meas}$)+w=a·$x_{\_meas}$+b+w.

In accordance with embodiments, the measurements of the one sensor output and the multiple process setting values can be used to calibrate the input variables and the output sensor. The fundamental input/output relationship between these factors is a property of the process itself—the relationship itself will not change because of sensor and/or control variable measurement values. The same input setting (setting values of input variables) shifts the process working condition slightly when the machine is used compared to the same input setting when the machine is brand new. The additive machine fingerprint for a specific machine unit is defined and specified when the machine is considered in factory-new and/or in suitable operational condition. It is at that juncture when the machine-specific fingerprint has its best fit to the generic model data (i.e., minimum fitting error).

The measured input variable setting values and the output measured values during the usage (calibration time) are corrected by the calibration functions with a set of guessing values (or nominal values, previous known values) of the unknown parameters in the calibration functions. The corrected measured values are fit to the nominal machine-specific fingerprint, minimizing the fitting error by changing the calibration parameter. The solution(s) of the minimization problem will be the calibration parameter(s)/offset(s) needed to maintain operation of the additive machine within product quality tolerances.

Figure 2:
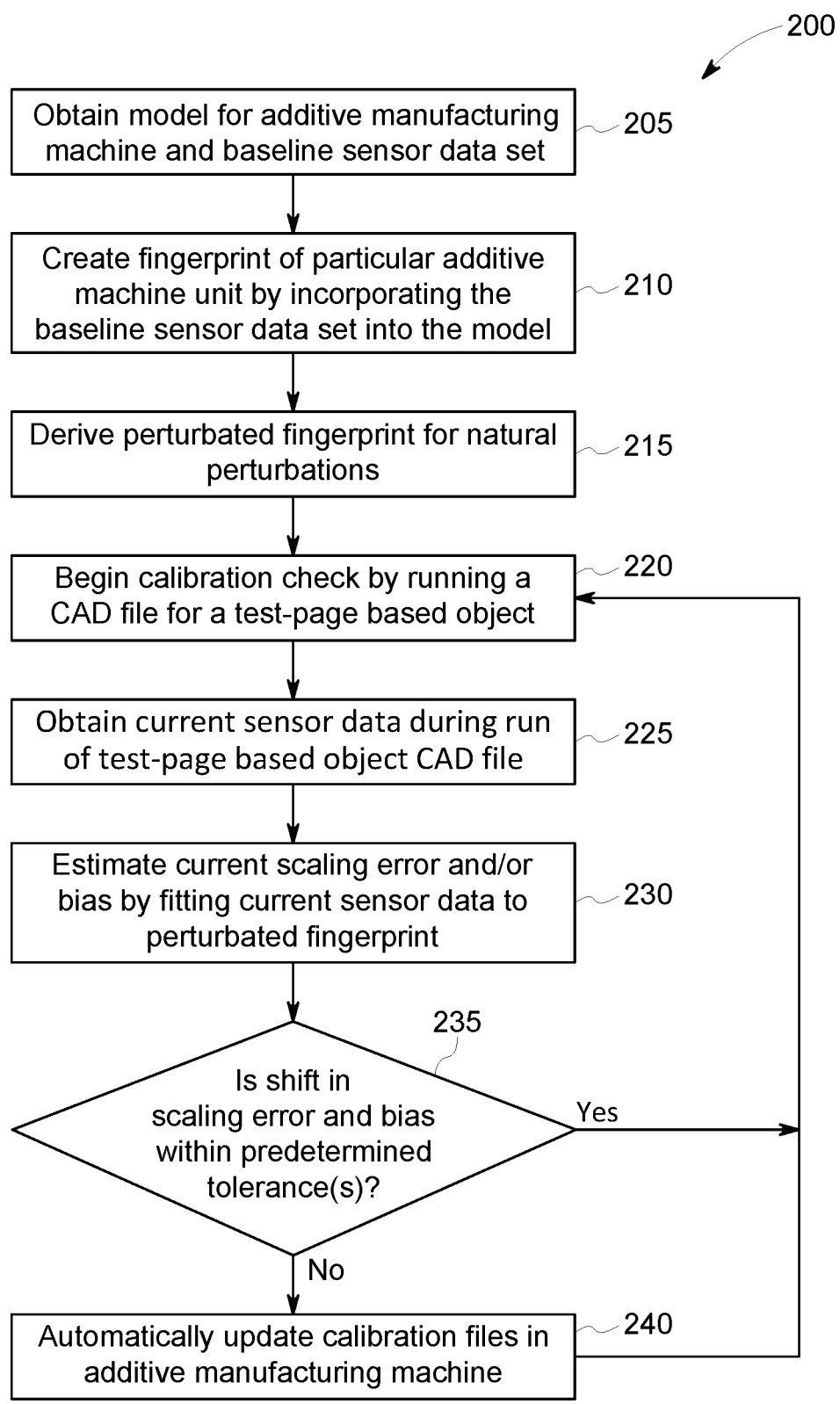
FIG. 2 illustrates a flowchart for a process to calibrate an additive manufacturing machine in accordance with embodiments.

FIG. 2 illustrates process 200 for an algorithm to perform calibration of an additive manufacturing machine using production of a test-page based object in accordance with embodiments. A generic model of the additive manufacturing machine is obtained, step 205, along with a baseline sensor data set.

The machine parameters that can shift (e.g., power calibration curve, beam focus, melt pool temperature, etc.) are treated as the independent variables in the generic model. The model can be generic for the line of additive machines represented by the particular machine undergoing calibration. The baseline sensor data set is obtained by recording APD response values when the additive machine unit is in factory new and/or in suitable operational condition. These test results describe the machine at nominal condition in a response surface or build a machine/process model (d for disturbance): APD=y=f(LP, SS, BS)+d.

The baseline sensor data set is incorporated, step 210, into the generic model to create a machine-specific fingerprint. This fingerprint is specific to the particular additive machine unit from which the baseline sensor data set was obtained.

The machine specific fingerprint is perturbed, step 215, for natural perturbations. The perturbation is achieved by introducing different values into one or more independent variables of the fingerprint. In accordance with embodiments, the natural perturbation can be estimated by adjusting the value of scaling and/or bias error.

At this juncture, the additive machine can begin its production run. At some future point in time (after some usage of the machine), a user can decide to verify the calibration of the additive machine. This decision can be based on units produced, operation longevity, manufacturer recommendation, product inspection results, or other factors. It should be readily understood that embodying systems and methods are independent of when the decision is made to verify calibration.

When the decision to calibrate is made, process 200 begins a calibration check by running, step 220, a CAD file for a test-page based object. During production of the test-page based object, a current sensor data set of APD response values is obtained, step 225.

Any scaling error and/or bias in the additive machine's operation can be estimated, step 230, by fitting the current sensor data set to the machine-specific fingerprint.

Scaling error and/or a bias in the additive machine operational condition is evaluated to determine if the scaling error and/or bias are within predetermined tolerance(s), step 235. A scaling factor approaching 1 and a bias approaching 0 indicates acceptable drift in the machine's operational drift. The tolerances on scaling error and/or bias are determined by the quality requirements on the production parts built by the additive machine. If within tolerance, the additive machine does not need recalibration. Process 200 can continue to step 220 once a subsequent decision is made to verify calibration.

Should a scaling error and/or bias be determined to be outside of predetermined tolerances (step 235), process 200 automatically updates, step 240, calibration files, tables, and/or curves in the additive machine. After the update, process 200 can continue to step 220 once a subsequent decision is made to verify calibration.

Parameters in the calibration relationship (i.e., the calibration curves) can be estimated based on the best fit of the current data set to the machine-specific fingerprint. However, for certain situations it might not be possible to identify all the calibration curve updates due to confounding terms—e.g., linear model cannot estimate two bias terms in two input calibration curves; or one input bias term and one output bias term.

For most additive manufacturing machines, laser power (LP) and beam size (BS) an have an effect on APD sensor response. An increase in laser power can lead to an increased APD sensor response, but the near-linear relationship between laser power and sensor response does not hold over the full range of applicable laser power or sensor dynamic range. Similarly, increase of beam size can also lead to an increased APD sensor response, but the relationship behavior has more nonlinearity.

Figures 3, 4:
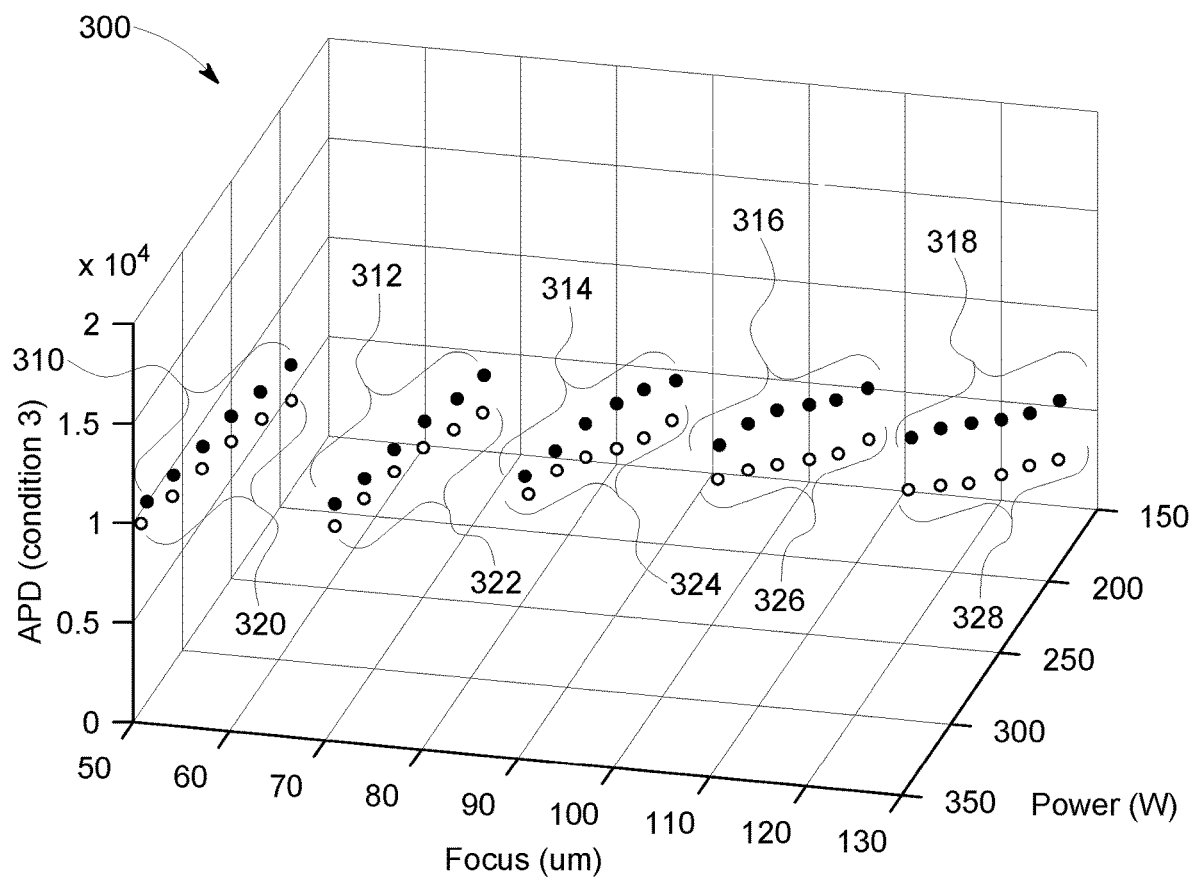
FIG. 3 graphically illustrates experimental measurement results for the process of FIG. 2 in accordance with embodiments.
FIG. 4 illustrates tabular simulation results for the process of FIG. 2 in accordance with embodiments.

FIG. 3 graphically illustrates experimental results 300 of an embodying method obtained for differing power levels and beam conditions. The additive machine was considered to be in its nominal condition. Data was collected for a set of tests with six different laser power levels (190 W, 220 W, 250 W, 280 W, 310 W, 340 W respectively) and five different beam sizes (50, 70, 90, 110, 130 micron (μm) respectively). Data sets were collected under different machine operational conditions (nominal condition; LP shift down 25 W; LP shift down 50 W; BS shift up 20 µm; BS shift up 40 µm; LP shift down 50 W and BS shift up 40 µm simultaneously). Each test is a cylindrical part, with 100 layers of material deposition.

The mean value of APD sensor response for the top 50 layers of each part is used in the modeling and calibration process. The result of one test is a data point in the response space of APD Vs. Laser Power and Beam Size (Focus). Data point sets 310, 312, 314, 316, 318 are for the nominal condition. Data point sets 320, 322, 324, 326, 328 are for the condition with 50 W shift down (Condition 3) on LP settings. The response is close to a linear relationship, but showing some nonlinearity. A full-term quadratic model is used to describe how APD response is related to LP and BS based on the normal test data points (Condition 1):

$$APD = C_1 * LP^2 + C_2 * BS^2 + C_3 * LP * BS + C_4 * LP + C_5 * BS + C_6$$

The coefficient parameters in the above model are estimated as [−0.061154 −0.1118 0.49811 28.552 −52.785 1392.9] with fitting R2=0.9849, which indicates the model fits to the experiment data producing small residuals. For the case of BS shift up 40 µm (Condition 5), with both bias terms assumed on LP and BS as the calibration parameters, the test data set is used to matching to the quadratic process model and leads to the laser power bias term estimated as −2.88 with 95% Confidence Interval (CI) as [−4.35, −1.40] while the beam size bias term estimated as 40.83 with 95% CI as [38.97, 42.68]. The results indicate that the estimated bias terms on LP and BS are pretty close to the true values with only a small bias on the LP bias term.

FIG. 4 depicts Table I presenting simulation results of an embodying method in accordance with embodiments. The table includes results from ten simulated cases exemplifying a simple case of only laser power degradation. The results of these simulation demonstrate that an embodying method provides a good estimate of the calibration parameters (unbiased, small variation).

For purposes of this example, a process shift or change are manifested only as a degradation in laser power with scaling factor and bias factor—i.e., there are no other changes in the process. (e.g., assume: $LP_{true}=0.98 \cdot LP_{meas}-5.0$—i.e., 0.98 and −5.0 are the true values of the calibration parameters, the scaling factor and the bias, to be estimated).

The values of melt pool width from simulations instead of measured APD values are used as process output responses. A high-fidelity, physics-based, nonlinear model is used for the melt pool behavior. In the working range the melt pool width (µm) has the following relationship (fingerprint model) with the laser power and the beam size from regression: Width=0.31263*LP+0.23277*BS+62.723.

A total of ten different calibration tests are simulated (BS=90 um) with white noise (Gaussian normal distribution) in the output, where each test has eighteen data points (sampled laser power settings, i.e., values of $LP_{meas}$), and the melt pool width data is recorded and fitted to the fingerprint with the calibration parameters to be estimated through optimization.

One case of calibration optimization will lead to: $LP_{true}=0.97868 \cdot LP_{meas}-4.7746$, which is a close approximation of the true values in above assumption. The overall mean values of the estimated scaling factor and the estimated bias from the 10 tests and the sample estimated standard deviation are also listed in the table. The mean estimated calibration parameter values are very close to their true values respectively, well within the 95% Confident Intervals of the estimation, which are 1.96 times of the standard deviation values respectively.

The following discussion is based on a case where both laser power degradation and beam size shift simultaneously. Assume the laser power degradation has a scaling factor and bias factor (e.g., assume $LP_{true}=0.98 \cdot LP_{meas}-5.0$). A similar assumption is made for representing a shift of the beam size control variable (e.g., assume $BS_{true}=1.02 \cdot BS_{meas}-1.3$). The melt pool width (um) has the same first order model: width=0.31263*LP+0.23277*BS+62.723.

Fifty different calibration tests where simulated with noise in the output, and the sensor results were fitted to a machine-specific fingerprint in accordance with embodiments. Both the scaling factors for the laser power and the beam size can be uniquely determined by an embodying method. However the first order model leads to effects from the two bias terms of the two inputs combined together—i.e., confounding between the effects with the model, and cannot uniquely be determined.

To separate the confounding effect, an assumption is made for the minimum variance of the bias terms (min Sum Square). These assumption results are [0.97899 −3.8853 1.0268 −2.8929] for LP scaling factor, LP bias, BS scaling factor and BS bias respectively. If an assumption is made that the bias term is proportional to the scaling factors, the four parameters are [0.97899 −3.391 1.0268 −3.5567]. With these bias term assumptions, an embodying method implementing the additive machine calibration method can lead to a close approximation of the initial assumption of the calibration parameters. In accordance with embodiments, a higher order model, which contains more information on the calibration parameters, can distinguish the bias effects contributed by two different control variables uniquely without any extra assumption.

Figure 5:
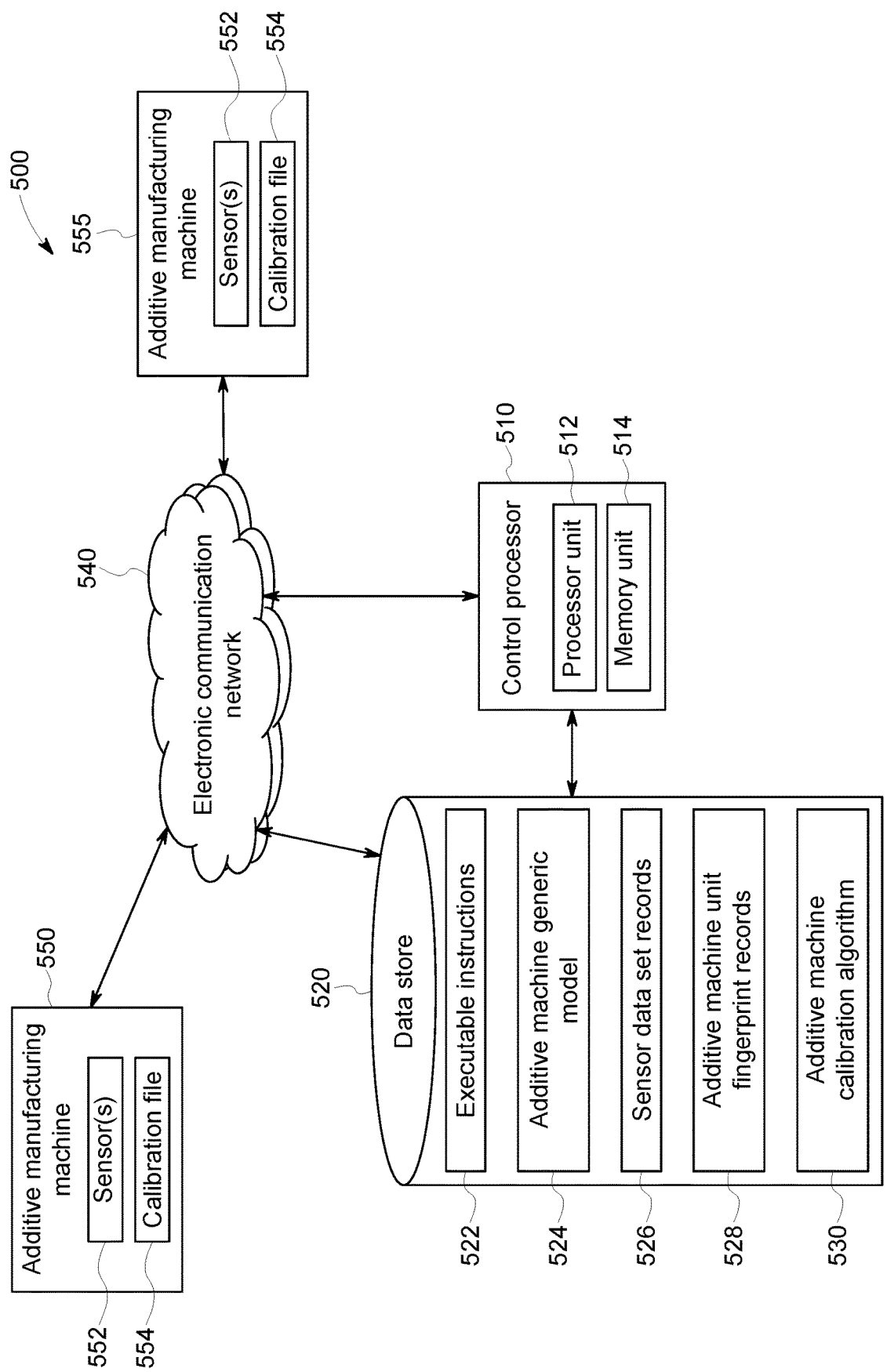
FIG. 5 illustrates a system for implementing the process of FIG. 2 in accordance with embodiments.

FIG. 5 illustrates system 500 for calibration of an additive manufacturing machine using production of a test-page based object in accordance with embodiments. Data store 520 can include additive machine generic model 524, sensor data set records 526, and additive machine unit fingerprint records 528.

System 500 can include control processor 510 in communication with data store 520. The control processor can be in direct communication with the data store, or in indirect communication across electronic communication network 540. Processor unit 512 can execute executable instructions 522, which cause the processor to perform additive machine calibration algorithm 532. Memory unit 514 can provide the control processor with local cache memory.

System 500 can include one or more additive machines 550, 555. Additive machine 550 can be of a first domain, and additive machine 555 can be of a second domain (i.e., different units of the same machine design; different machine designs; and/or different deposition material). Each additive machine can include sensor(s) 552 that provide sensor data for its respective additive machine. The additive machine can also include calibration file 554, which provides the additive machine control with offsets to control settings. These offsets are specific for the particular machine. The additive machines can be in communication with the data store across electronic communication network 540.

Embodying systems and methods result in a reduced machine installation time and re-calibration time. The test-page based object CAD file can be designed to run in less than 30 minutes. Embodiments provide predictive recalibration—i.e., sensor data incorporated into comparison between an updated machine-specific fingerprint incorporating current sensor data and a machine-specific nominal fingerprint can inform whether a recalibration is necessary or not. This approach eliminates the conventional approach of scheduling a production halt to perform a manual recalibration, which can typically last hours to days. An embodying algorithmic approach is not expert dependent, as is the conventional expert-dependent calibration approach. Contrary to the conventional approaches, embodying methods require minimal intervention from a machine's operator.

Embodying systems and methods provide a reduction in machine installation labor thus, saving on installation costs and leading to increased (and sooner) machine production throughput. By performing predictive recalibration embodiments reduce unnecessary maintenance cost. Additionally, because the additive machine is off production for a minimum time, more insight into the machine's constituent component status can be obtained (e.g., if the laser requires frequent calibration, perhaps the laser needs to be checked). Embodiments are not limited to additive manufacturing machines and can be implemented in other technology areas/industries.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods disclosed herein, such as a method of performing automatic calibration of an additive machine using a test-page based object CAD file, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A method of calibrating an additive manufacturing machine, the method comprising:
   obtaining a model for the additive manufacturing machine;
   obtaining a baseline sensor data set for a particular additive manufacturing machine;
   creating a machine-specific nominal fingerprint for the particular additive manufacturing machine with controllable variation for one or more process inputs;
   producing on the particular additive manufacturing machine a test-page based object;
   obtaining a current sensor data set of the test-page based object on the particular additive manufacturing machine;
   estimating a scaling factor error or a bias for each of the one or more process inputs from the current data set by:
      deriving a machine-specific perturbated fingerprint by introducing a variation to laser power level process inputs to the additive manufacturing machine and beam size process inputs to the additive manufacturing machine; and
      fitting the current sensor data set to the machine-specific perturbated fingerprint with the scaling factor error or the bias as the parameters to be estimated; and
   updating a calibration file for the particular additive manufacturing machine if the estimated scaling factor error or the estimated bias are greater than a respective predetermined tolerance.

2. The method of claim 1, including the model generically representing the particular additive manufacturing machine.

3. The method of claim 1, including recording sensor data to the baseline sensor data set during operation of the particular additive manufacturing machine in new or suitable operational condition.

4. The method of claim 1, including creating the machine-specific nominal fingerprint by incorporating the baseline sensor data set in the generic model.

5. The method of claim 1, including using a test-page based object CAD file to produce the test-page based object.

6. The method of claim 1, including recording sensor response data to the current sensor data set during production of the test-page based object.

7. A non-transitory computer-readable medium having stored thereon instructions which when executed by a processor cause the processor to perform calibrating an additive manufacturing machine, the method comprising:
   obtaining a model for the additive manufacturing machine;
   obtaining a baseline sensor data set for a particular additive manufacturing machine;
   creating a machine-specific nominal fingerprint for the particular additive manufacturing machine with controllable variation for one or more process inputs;
   producing on the particular additive manufacturing machine a test-page based object;
   obtaining a current sensor data set of the test-page based object on the particular additive manufacturing machine;
   estimating a scaling factor error or a bias for each of the one or more process inputs from the current data set by:
      deriving a machine-specific perturbated fingerprint by introducing a variation to laser power level process inputs to the additive manufacturing machine and beam size process inputs to the additive manufacturing machine; and
      fitting the current sensor data set to the machine-specific perturbated fingerprint with the scaling factor error or the bias as the parameters to be estimated; and
   updating a calibration file for the particular additive manufacturing machine if the estimated scaling factor error or the estimated bias are greater than a respective predetermined tolerance.

8. The medium of claim 7, the executable instructions causing the processor to perform the method by the model generically representing the particular additive manufacturing machine.

9. The medium of claim 7, the executable instructions causing the processor to perform the method by recording sensor data to the baseline sensor data set during operation of the particular additive manufacturing machine in new or suitable operational condition.

10. The medium of claim 7, the executable instructions causing the processor to perform the method by creating the machine-specific nominal fingerprint by incorporating the baseline sensor data set in the generic model.

11. The medium of claim 7, the executable instructions causing the processor to perform the method by using a test-page based object CAD file to produce the test-page based object.

12. The medium of claim 7, the executable instructions causing the processor to perform the method by recording sensor response data to the current sensor data set during production of the test-page based object.

13. The medium of claim 7, the executable instructions causing the processor to perform the method by:
- comparing the estimated scaling factor error and the estimated bias to the respective predetermined tolerance;
- if outside the predetermined tolerance, automatically updating calibration files in the additive manufacturing machine; and
- if within the predetermined tolerance, performing a calibration check at a later time.

\* \* \* \* \*